United States Patent
Tanaka et al.

(10) Patent No.: US 8,045,227 B2
(45) Date of Patent: Oct. 25, 2011

(54) PRINT CONTROLLING DEVICE, IMAGE FORMING DEVICE, PRINT CONTROLLING METHOD, AND COMPUTER READABLE RECORDING MEDIUM STORING CONTROL PROGRAM

(75) Inventors: Yoshinori Tanaka, Hachioji (JP); Yoko Fujiwara, Hachioji (JP); Fumihito Akiyama, Hachioji (JP); Masahiro Ozawa, Hachioji (JP); Jun Kuroki, Hachioji (JP); Hiroshi Nogawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1039 days.

(21) Appl. No.: 11/400,393

(22) Filed: Apr. 10, 2006

(65) Prior Publication Data

US 2007/0146757 A1 Jun. 28, 2007

(30) Foreign Application Priority Data

Dec. 27, 2005 (JP) .................................. 2005-375359

(51) Int. Cl.
G06K 15/02 (2006.01)
(52) U.S. Cl. ........ 358/2.1; 358/1.9; 358/3.01; 358/1.15; 382/180
(58) Field of Classification Search ............... 382/180; 358/1.9, 2.1, 3.01, 1.15
See application file for complete search history.

(56) References Cited

U.S. PATENT DOCUMENTS

| 6,804,028 | B1* | 10/2004 | Fukuta ............................ 358/2.1 |
| 6,825,943 | B1 | 11/2004 | Barry et al. |
| 6,995,852 | B1* | 2/2006 | Urasawa ....................... 358/1.15 |
| 2005/0185222 | A1 | 8/2005 | Sammis et al. |
| 2005/0219661 | A1* | 10/2005 | Hirabayashi ................... 358/518 |
| 2007/0002348 | A1* | 1/2007 | Hagiwara ...................... 358/1.13 |

FOREIGN PATENT DOCUMENTS

JP 2004-243569 9/2004

OTHER PUBLICATIONS

European Search Report dated Nov. 25, 2008.

* cited by examiner

*Primary Examiner* — Sudhanshu Pathak
*Assistant Examiner* — Kent Yip
(74) *Attorney, Agent, or Firm* — Finnegan, Henderson, Farabow, Garrett & Dunner, L.L.P.

(57) ABSTRACT

Disclosed is a print controlling device including a control unit to control printing according to an instruction which relates to the printing, wherein the control unit analyzes a page description language which relates to the printing, determines whether the printing is practically monochrome printing or color printing, and changes a first command of the page description language to a second command for monochrome printing when it is determined that the printing is monochrome printing.

32 Claims, 10 Drawing Sheets

PRINT CONTROLLING DEVICE, IMAGE FORMING DEVICE, PRINT CONTROLLING METHOD, AND COMPUTER READABLE RECORDING MEDIUM STORING CONTROL PROGRAM

BACKGROUND OF THE INVENTION

1. Field of the Invention

The present invention relates to a print controlling device, an image forming device provided with the print controlling device, a print controlling method, and a computer readable recording medium storing a control program.

2. Description of the Related Art

When a monochrome document prepared by an application for document preparation is printed by a color printer, there is a case where the monochrome document is processed as a color document. This is caused, since a particular application generates a data to conduct processing of the monochrome document as a color document at a printer driver, the printer driver outputs data using a command which assigns color. At an interpreter, since the command assigns color, processing is conducted as color, and color printing is executed. Therefore, even for a monochrome document, unnecessary color processing and the like are conducted, resulting in decrease in processing speed. In addition, in case of a printer which charges for color printing, inconvenience arose in that money was charged even when it was a monochrome document.

Concerning above problems, a technique for processing monochrome document as a monochrome is in demand. As for such technique, for example, in Japanese Laid-open Patent Specification No. 2004-243569, a technique to draw as monochrome for data sent as monochrome, and to draw as color for data sent as color, is disclosed. According to the technique, information, indicating whether each pixel is a color pixel or a monochrome pixel, is attached to information plane (Tag bit) when a draw command (PDL (Page Description Language) data) is converted into a bit map data.

However, concerning the above conventional image forming device, it was determined whether a printing is a color printing or a monochrome printing, after conversion to bit map (after rasterization). Therefore, burden of processing was large, and decrease in processing speed and determination accuracy were likely to occur.

SUMMARY

The present invention has been made to solve the above problem. An object of the present invention is to increase processing speed and to improve determination accuracy, by determining whether a printing is a color printing or a monochrome printing, based on a page description language.

A printing controlling device according to an embodiment reflecting one aspect of the invention comprises: a control unit to control printing according to an instruction which relates to the printing; wherein the control unit: analyzes a page description language which relates to the printing, and determines whether the printing is practically monochrome printing or color printing; and changes a first command of the page description language to a second command for monochrome printing when it is determined that the printing is monochrome printing.

Preferably, the control unit does not conduct a following determination processing which relates to the printing when it is determined that the printing is color printing.

Additionally, the control unit may determine whether the printing is practically monochrome printing or color printing for each page.

An image forming device according to an embodiment reflecting another aspect of the invention comprises: a receiving unit to receive an instruction which relates to printing; a control unit to control the printing according to the instruction which relates to the printing received by the receiving unit; and a printing unit to execute the printing according to a control from the control unit; wherein the control unit: analyzes a page description language which relates to the printing, and determines whether the printing is practically monochrome printing or color printing; and changes a first command of the page description language to a second command for monochrome printing when it is determined that the printing is monochrome printing.

Preferably, the control unit does not conduct a following determination processing which relates to the printing when it is determined that the printing is color printing.

Additionally, the control unit may determine whether the printing is practically monochrome printing or color printing for each page.

A print controlling method according to an embodiment reflecting one aspect of the invention comprises: an analyzing and determining step to analyze a page description language which relates to a printing, and determine whether the printing is practically monochrome printing or color printing; and a changing step to change a first command of the page description language to a second command for monochrome printing when it is determined that the printing is monochrome printing.

Preferably, a following determination processing which relates to the printing is not conducted when it is determined that the printing is color printing.

Additionally, determination whether the printing is practically monochrome printing or color printing may be conducted for each page.

A computer readable recording medium according to an embodiment reflecting another aspect of the invention that stores a control program which is executed by a control unit of print controlling device that controls printing according to an instruction which relates to the printing, the control program causing the control unit execute: a analyzing and determining step to analyze a page description language which relates to the printing, and determine whether the printing is practically monochrome printing or color printing; and a changing step to change a first command of the page description language to a second command for monochrome printing when it is determined that the printing is monochrome printing.

Preferably, the control program does not cause the control unit execute a following determination processing which relates to the printing when it is determined that the printing is color printing.

Additionally, the control program may cause the control unit execute determination on whether the printing is practically monochrome printing or color printing for each page.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein.

DETAILED DESCRIPTION OF THE PREFERRED EMBODIMENTS

An embodiment of the present invention will be described hereinafter with reference to figures.

First of all, a system structure according to the embodiment will be explained.

Figure 1:
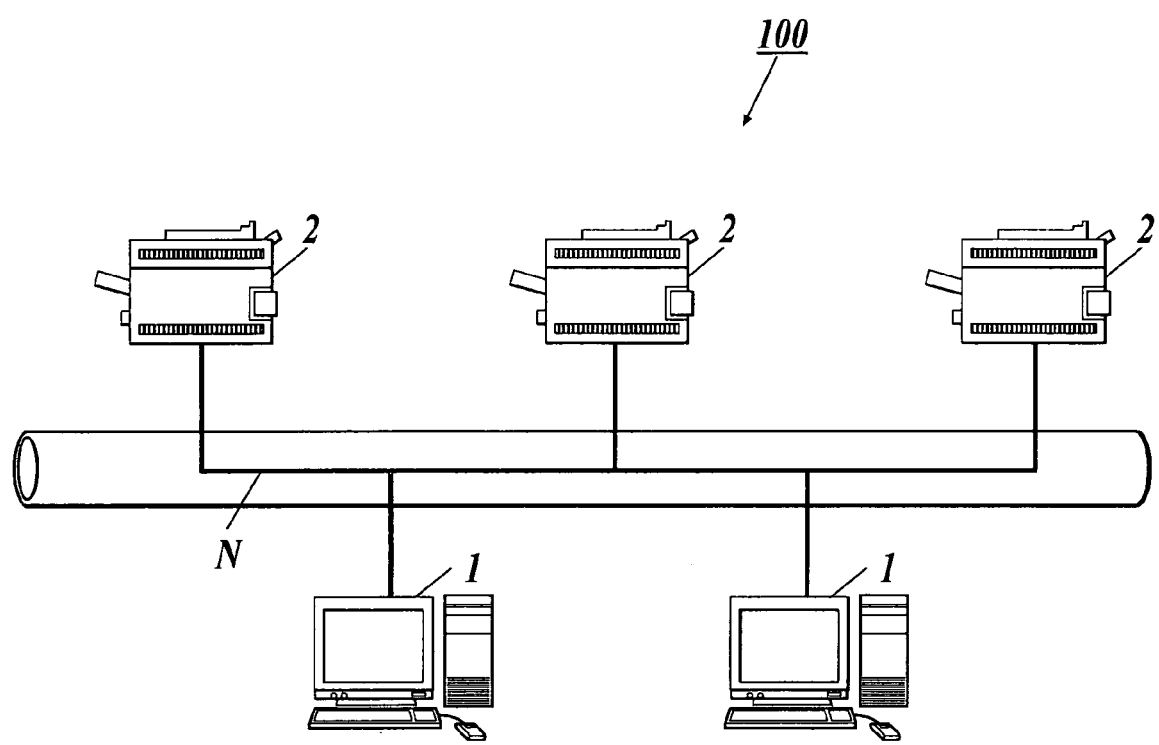
FIG. 1 is a view showing a structure of an image forming system according to the embodiment of the present invention.

FIG. 1 shows a structure of an image forming system 100 according to the embodiment of the present invention. As shown in FIG. 1, the image forming system 100 comprises a PC (Personal Computer) 1 and an image forming device 2, such as a printer, copy machine, and the like. The PC 1 and the image forming device 2 are connected through a communication network N.

The communication network N comprises LAN (Local Area Network) which connects apparatuses through standards such as Ethernet (registered trademark), TokenRing, FDDI (Fiber Distributed Data Interface), and the like; WAN (Wide Area Network) which connects the LAN through an exclusive line; and the like.

Here, the number of PC 1 and the number of image forming device 2 connected to the communication network N are not limited. In addition, connecting means for the PC 1 and the image forming device 2 is not limited to network connection, and may be connected through a local connection.

Figure 2:
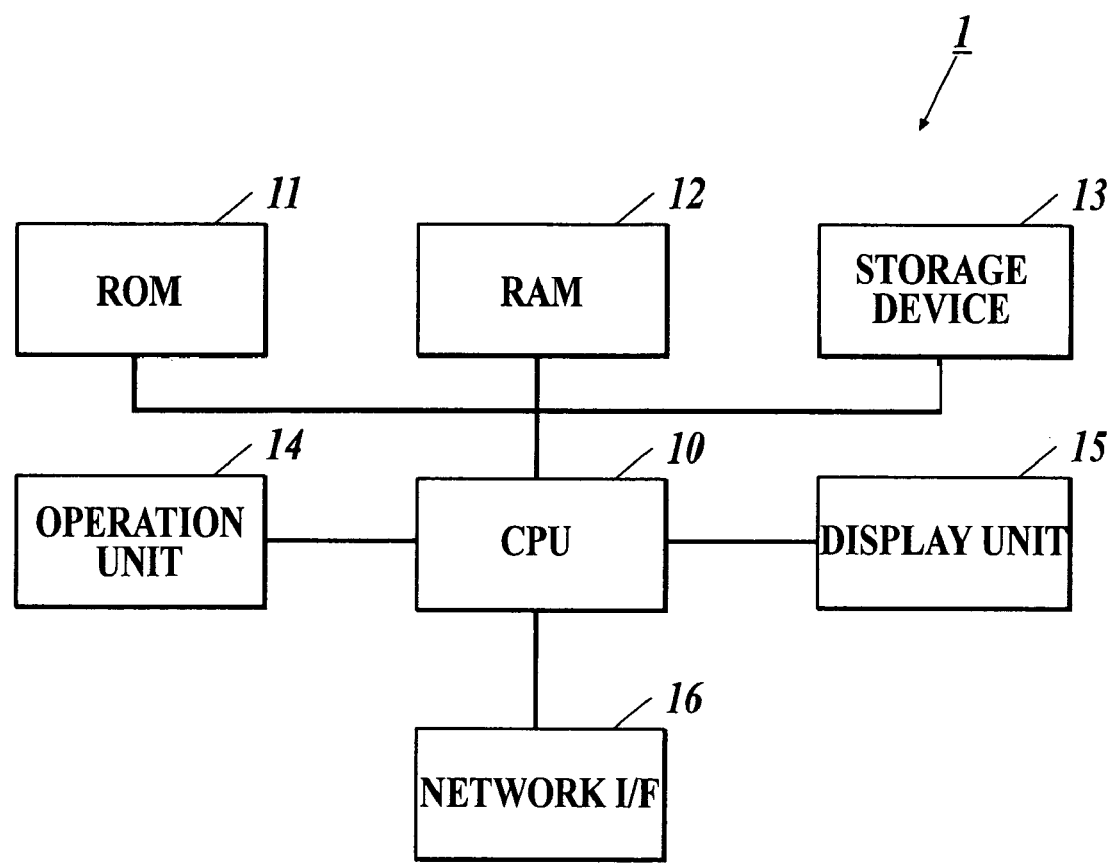
FIG. 2 is a block diagram showing a structure of main portion of a PC according to the present embodiment.

FIG. 2 shows a structure of main portion of the PC 1. As shown in FIG. 2, the PC 1 comprises CPU (Central Processing Unit) 10, ROM (Read Only Memory) 11, RAM (Random Access Memory) 12, storage device 13, operation unit 14, display unit 15, and network I/F 16.

The CPU 10 controls performance of each unit of the PC 1 according to a control program stored in the ROM 11. For example, when printing of a file is instructed from the operation unit 14, the CPU 10, by using a printer driver which is a software to control printing, executes processing which converts the file into page description languages (PDL) such as PS (PostScript), PCL (Printer Control Language), and the like, and sends them to the image forming device 2 through the network I/F 16.

The ROM 11 stores control program to actualize various kinds of performances of the PC 1 executed by the CPU 10, and data used when the control program is executed.

The RAM 12 spreads various kinds of control programs executed by the CPU 10 in a program storage area, and temporarily stores data, such as processing result obtained by executing these control programs, in a work area.

The storage device 13 comprises a recording medium that conducts record reproduction magnetically or optically, a recording medium of a semiconductor memory, and the like, and conducts writing and reading of instructed data. This recording medium is either provided fixedly, or attached in a detachable manner to the storage device 13.

The operation unit 14 includes numeric keypad, cursor key, and various kinds of functional keys, and outputs an operation signal by key depression to the CPU 10.

The display unit 15 comprises a display such as LCD (Liquid Crystal Display) and the like, and performs required display processing corresponding to a display control signal inputted from the CPU 10.

The network I/F 16 is an interface to connect the PC 1 with external device through communication network N. As for the external device, the image forming device 2 and the. like can be mentioned.

Figure 3:
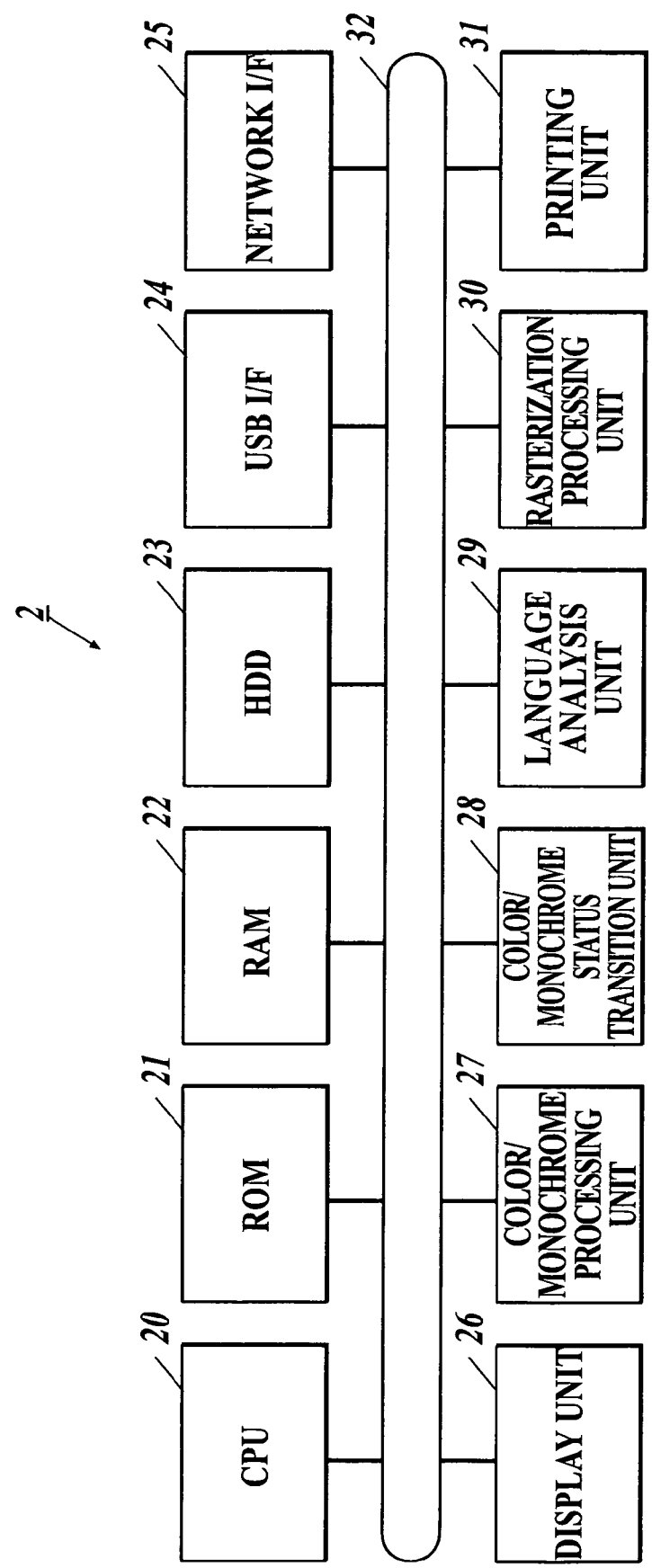
FIG. 3 is a block diagram showing a structure of main portion of an image forming device according to the present embodiment.

FIG. 3 shows a structure of main portion of the image forming device 2. As shown in FIG. 3, the image forming device 2 comprises CPU 20, ROM 21, RAM 22, HDD (Hard Disc Drive) 23, USB (Universal Serial Bus) I/F 24, network I/F 25, display unit 26, color/monochrome processing unit 27, color/monochrome status transition unit 28, language analysis unit 29, rasterization processing unit 30, and printing unit 31, and are connected through bus 32.

The CPU 20 controls performance of each part of the image forming device 2, according to a control program stored in ROM 21. Print processing executed under control by the CPU 20 will be described later in detail with reference to FIG. 4 through FIG. 10.

The ROM 21 stores control program to actualize various kinds of performances with regard to performance of the image forming device 2 executed by the control unit 20, and data used in case of executing the control program.

The RAM 22 spreads various kinds of control programs executed by the CPU 20 in the program storage area, and temporarily stores data, such as inputted print data, processing result obtained by executing the various kinds of control programs, and the like in a work area. The HDD 23 stores data such as confidential printing job data and the like.

The USB I/F 24 is an interface to connect USB memory.

The network I/F 25 is an interface to connect the image forming device 2 with an external device through communication network N. As for the external device, PC 1 can be mentioned as an example.

The display unit 26 comprises a display such as LCD (Liquid Crystal Display) and the like. According to display control signal inputted from the CPU 20, the display unit 26 displays icons and key buttons, or displays various kinds of settings required for printing. The display unit 26 is provided with a touch-sensitive panel which covers the display, and detects coordinates by coordinate reading principles such as electromagnetic guidance, magnetostriction, pressure sensing, or the like, and outputs detected coordinates as a position signal to the CPU 20.

The color/monochrome processing unit 27, by analyzing page description language included in a print data inputted from PC 1 through the network I/F 25, determines whether the printing is practically a monochrome printing or a color printing, for each page. In case the color/monochrome processing unit 27 determines that it is a monochrome printing, a command of page description language is converted into a command for monochrome printing and outputted to the language analysis unit 29.

The color/monochrome status transition unit 28 manages a state transition of a current page that is analyzed by the color/monochrome processing unit 27. In the present embodiment, four state transitions as mentioned below are defined. Page description language will be referred to as PDL hereinafter.

[RGB]: A state in case a command of PDL assigns RGB, and it is not possible to determine whether content is Gray or not;

[Gray]: A state in case a command of PDL assigns Gray;

[RGB→Gray]: A state in case a command of PDL assigns RGB, content is determined as Gray, and the command is replaced so as to assign Gray;

[Only RGB]: A state in case a command of PDL assigns RGB, and content is determined as RGB.

Here, while a command within a page is analyzed, in case a state transition becomes [Only RGB] once, it is regarded that the page has already been assigned a command for color, and color printing is conducted. Therefore, color/monochrome determination processing (step S11 in FIG. 5) is not conducted thereinafter within that page.

The language analysis unit 29 analyzes print data inputted from PC 1 through network I/F 25 and color/monochrome processing unit 27, and generates intermediate data. Intermediate data is a data before spreading it into a bit map data, and can be stored in small portion compared to the bit map data.

The rasterization processing unit 30 converts the intermediate data generated by language analysis unit 29 into a printable bit map data.

The printing unit 31 prints the bit map data generated by the rasterization processing unit 30 by a predetermined method of printing (laser beam method, for example).

Here, according to the present embodiment, each of the color/monochrome processing unit 27, the color/monochrome state transition unit 28, the language analysis unit 29, and the rasterization unit 30, are functional module of aforementioned control program, and is actualized by the CPU 20.

Next, the performance according to the present embodiment is described.

Figure 4:
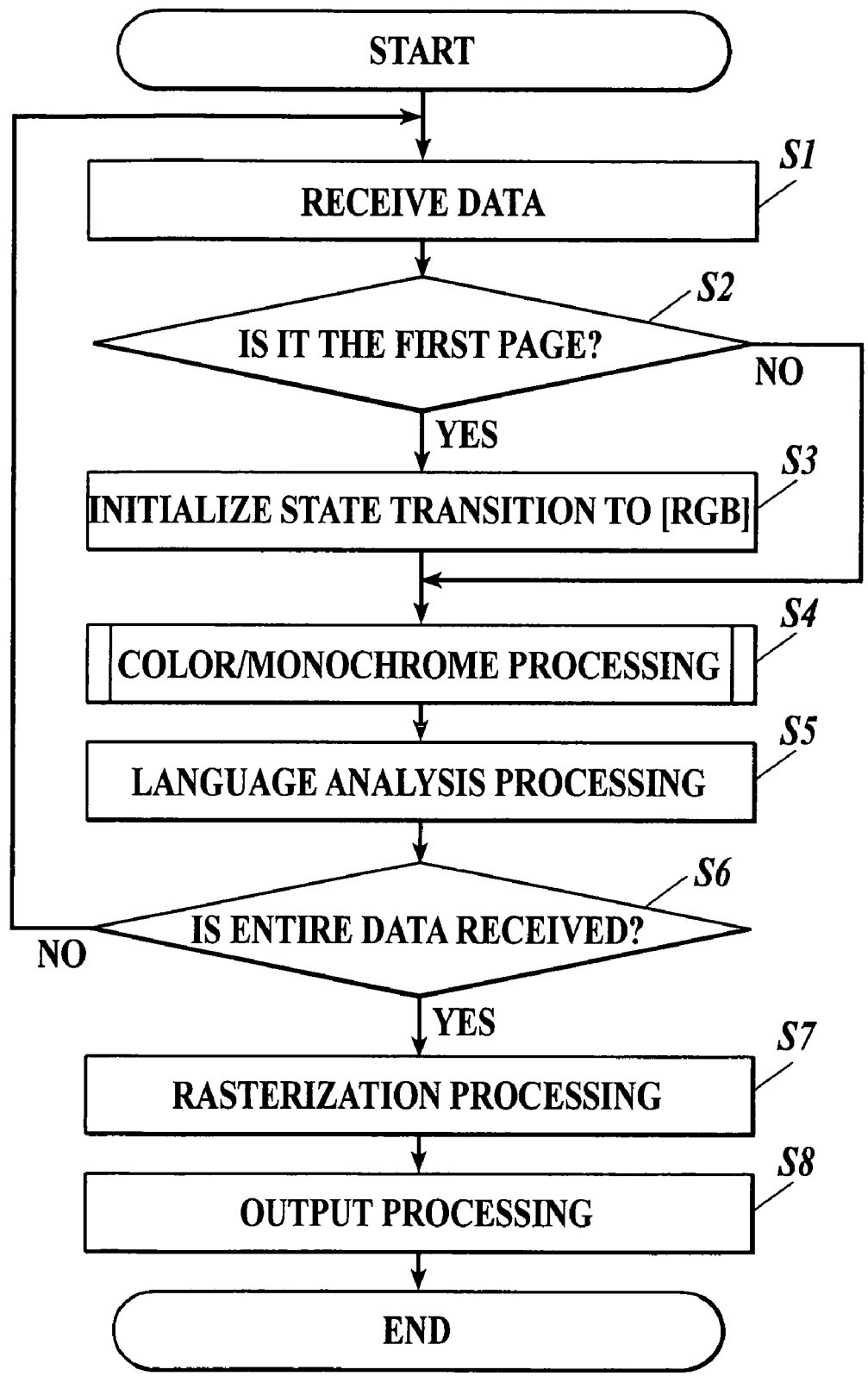
FIG. 4 is a flowchart showing a print processing executed by the image forming device according to the present embodiment.

First of all, with reference to flowchart of FIG. 4, print processing executed under control by the CPU 20 is described.

When a print data is inputted from PC 1 to the image forming device 2, print data (PDL) is received at the color/monochrome processing unit 27 (step S1), and it is determined whether the page is the first page or not (step S2).

In step S2, when it is determined that the page is not the first page (step S2; No), a color/monochrome processing (FIG. 5) described later is conducted (step S4). In step S2, when it is determined that the page is the first page (step S2; Yes); after the state transition is initialized to [RGB] (step S3), the color/monochrome processing (FIG. 5) described later is conducted (step S4).

After the color/monochrome processing is completed, analysis of print data is conducted at the language analysis unit 29, and an intermediate data is generated (step S5). Subsequently, it is determined whether the entire data is received from PC 1 or not (step S6). In step S6, when it is determined that the entire data is not received (step S6; No), it returns to step S1 and repeats the processing of steps S1 through S5.

In step S6, when it is determined that the entire data is received (step S6; Yes), the intermediate data is analyzed at the rasterization processing unit 30, and a bit map data is generated from the intermediate data (step S7). Subsequently, print output processing is conducted for the bit map data generated in step S7 at the printing unit 31 (step S8), and the print processing is completed.

Figure 5:
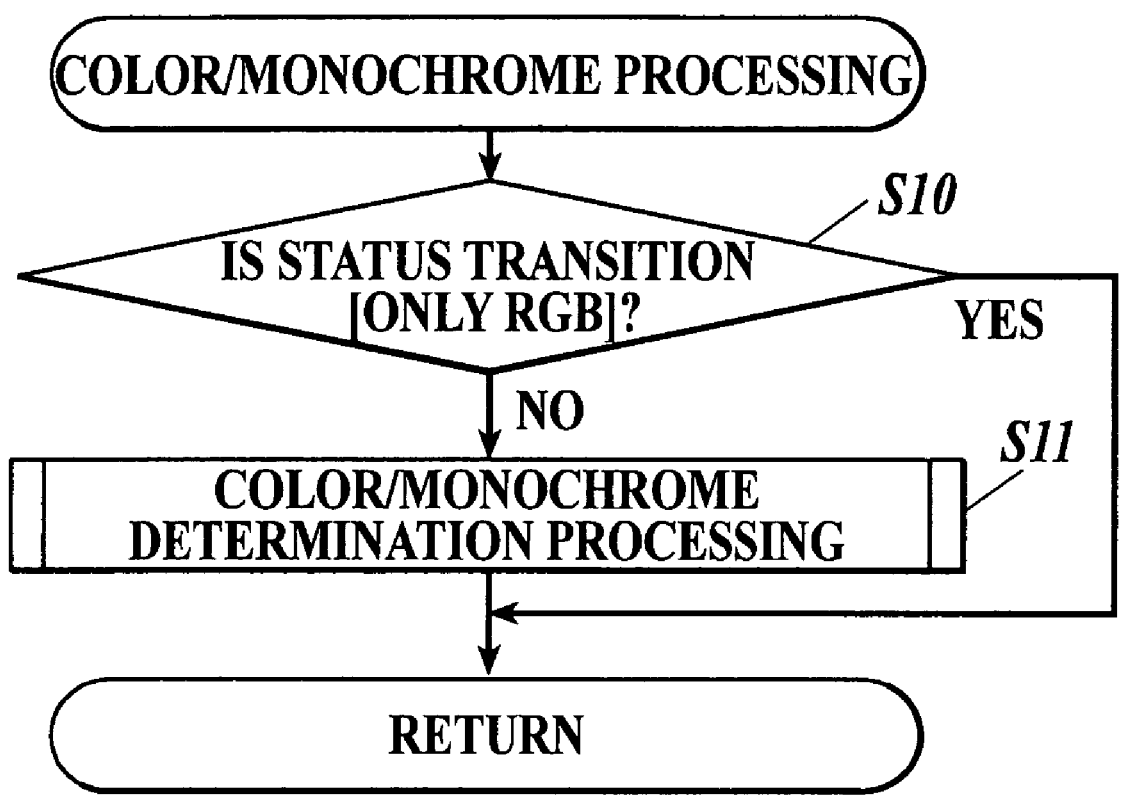
FIG. 5 is a flowchart showing a color/monochrome processing.

Next, with reference to flowchart of FIG. 5, the color/monochrome processing (step S4 of FIG. 4) is described in detail.

First of all, at the color/monochrome state transition unit 28, it is determined whether the current state transition within the page is [Only RGB] or not (step S10). In step S10, when it is determined that the current state transition is [Only RGB] (step S10; Yes), it is regarded that the page has already been assigned a command for color, and color printing is conducted. Therefore, color/monochrome determination processing of step S11 is not conducted thereinafter within that page, and moves on to step S5 of FIG. 4.

In step S10, when it is determined that the current state transition is other than [Only RGB] (step S10; No), color/monochrome determination processing described later (FIG. 6) is conducted (step S11), and the color/monochrome processing is completed.

Figure 6:
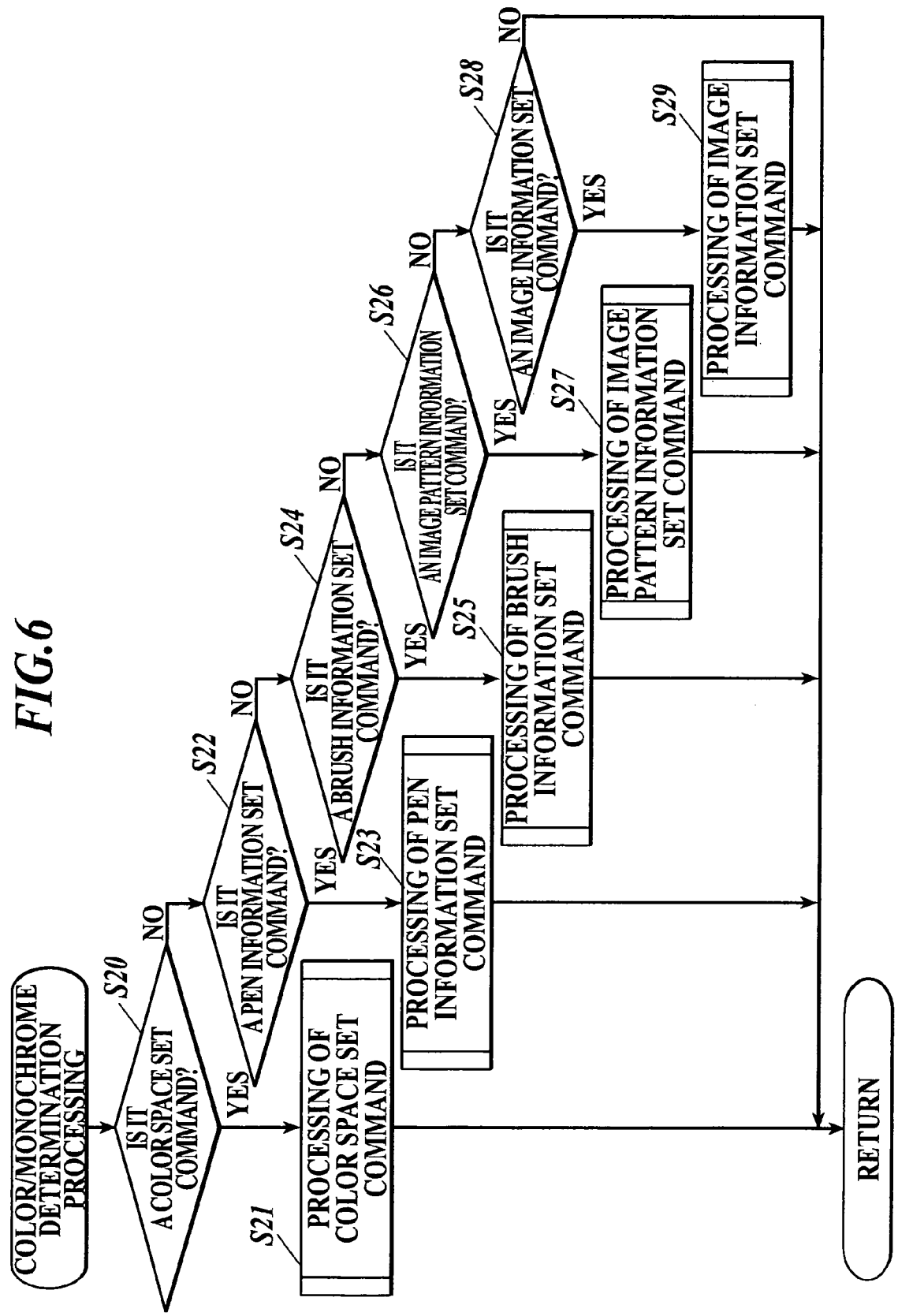
FIG. 6 is a flowchart showing a color/monochrome determination processing.

Next, with reference to flowchart of FIG. 6, the color/monochrome determination processing (step S11 of FIG. 5) is described in detail.

In the color/monochrome determination processing, each of the following processing is executed according to a command relating to color space of PDL, however, no processing is executed in case it is a command of other type. An example of command relating to color space is shown in Tables 1 and 2. As shown in Tables 1 and 2, concerning commands relating to color space, there are two types of commands, a command to set the color space, and a command to observe the color space. As shown in Table 1, as for commands to set the color space, there is color space set command, pen information set command, and brush information set command. Additionally, as shown in Table 2, as for commands to observe the color space, there is image pattern information set command and image information set command.

TABLE 1

| Command to Set Color Space | Object |
|---|---|
| Color Space Set Command | Set color space for pen information, brush information, image pattern information, and image information. Concerning color space, assigning RGB/Gray, and setting palette data, which can be used within image pattern information or image information, can be conducted. |
| Pen Information Set Command | Set pen information. A command to set colors when drawing vector or text. Color of pen can be assigned by RGB/Gray, or by pattern assigned by image pattern information. |
| Brush Information Set Command | Set brush information. Brush is a command to set colors to fill vector, text, or image. Color of brush can be assigned by RGB/Gray, or by pattern assigned by image pattern information. |

TABLE 2

| Command to Observe Color Space | Object |
|---|---|
| Image Pattern Information Set Command | Set image pattern information. Image pattern information can be used within pen information and brush information. Set information on whether size of image |

TABLE 2-continued

| Command to Observe Color Space | Object |
|---|---|
| | pattern, bit depth, or image pattern is assigned directly or by palette, and information of pattern ID. Image pattern is assigned within the color space assigned by the color space set command. Palette is also assigned by the color space set command. |
| Image Information Set Command | Set image information. Set information on whether size of image data, bit depth, or image data is assigned directly or by palette. |

First of all, it is determined whether the command of PDL is color space set command or not (step S20). In step S20, when it is determined that the command of PDL is color space set command (step S20; Yes), processing of color space set command (FIG. 7) described later is conducted (step S21), and the color/monochrome determination processing is completed.

In step S20, when it is determined that the command of PDL is not color space set command (step S20; No), it is determined whether the command of PDL is a pen information set command (step S22). In step S22, when it is determined that the command of PDL is a pen information set command (step S22; Yes), processing of pen information set command (FIG. 8) described later is conducted (step S23), and the color/monochrome determination processing is completed.

In step S22, when it is determined that the command of PDL is not pen information set command (step S22; No), it is determined whether the command of PDL is brush information set command (step S24). In step S24, when it is determined that the command of PDL is brush information set command (step S24; Yes), processing of brush information set command (FIG. 8) described later is conducted (step S25), and the color/monochrome determination processing is completed.

In step S24, when it is determined that the command of PDL is not brush information set command (step S24; No), it is determined whether the command of PDL is image pattern information set command (step S26). In step S26, when it is determined that the command of PDL is image pattern information set command (step S26; Yes), processing of image pattern information set command (FIG. 9) described later is conducted (step S27), and the color/monochrome determination processing is completed.

In step S26, when it is determined that the command of PDL is not image pattern information set command (step S26; No), it is determined whether the command of PDL is image information set command (step S28). In step S28, when it is determined that the command of PDL is image information set command (step S28; Yes), processing of image information set command (FIG. 9) described later is conducted (step S29), and the color/monochrome determination processing is completed.

In step S28, when it is determined that the command of PDL is not image information set command (step S28; No), the color/monochrome determination processing is completed.

Figure 7:
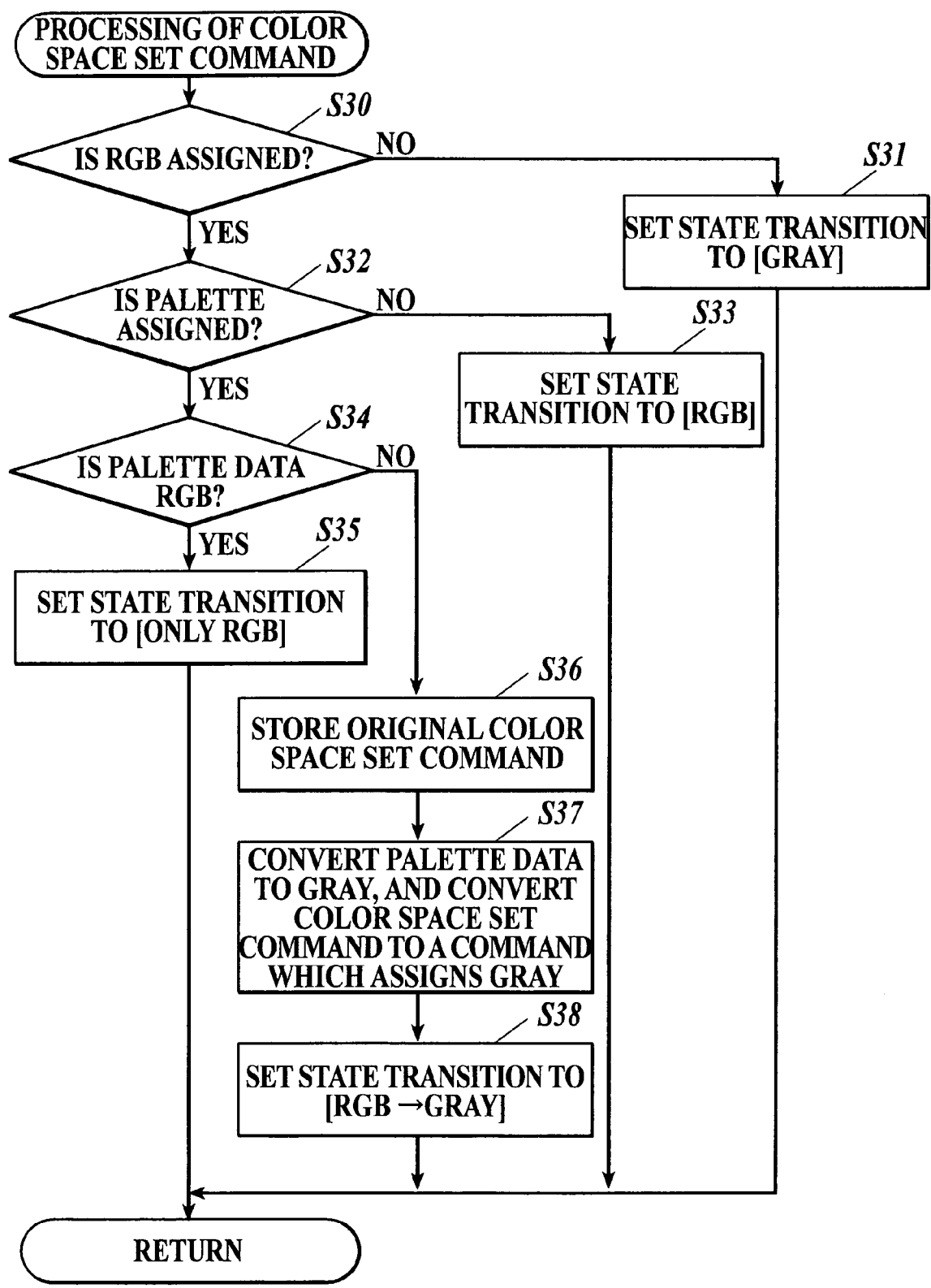
FIG. 7 is a flowchart showing processing of color space set command.

Next, with reference to flowchart of FIG. 7, processing of color space set command (step S21 of FIG. 6) is described in detail.

First of all, it is determined whether the color space assigned by the color space set command is RGB or not (step S30). In step S30, when it is determined that the color space is not RGB (step S30; No), the state transition is set to [Gray] (step S31), and the processing of color space set command is completed.

In step S30, when it is determined that the color space is RGB (step S30; Yes), it is determined whether palette is assigned or not (step S32). In step S32, when it is determined that palette is not assigned (step S32; No), the state transition is set to [RGB] (step S33), and the processing of color space set command is completed.

In step S32, when it is determined that palette is assigned (step S32; Yes), content of palette data is analyzed, and it is determined whether the content of palette data is RGB or not (step S34). In step S34, when it is determined that the content of palette data is RGB (step S34; Yes), the state transition is set to [Only RGB] (step S35), and the processing of color space set command is completed.

In step S34, when it is determined that the content of palette data is not RGB but mix gray (step S34; No), after the original color space set command is stored (step S36), palette data is converted to gray and the color space set command is converted to a command which assigns gray (step S37). Subsequently, the state transition is set to [RGB→Gray] (step S38), and the processing of color space set command is completed. Here, mix gray is a data, whose content is gray although the assigned color space is RGB, such as [255,255,255], for example. In such case, by converting the data to [255] and by setting command that assigns gray, color/monochrome determination processing is conducted.

Figure 10:
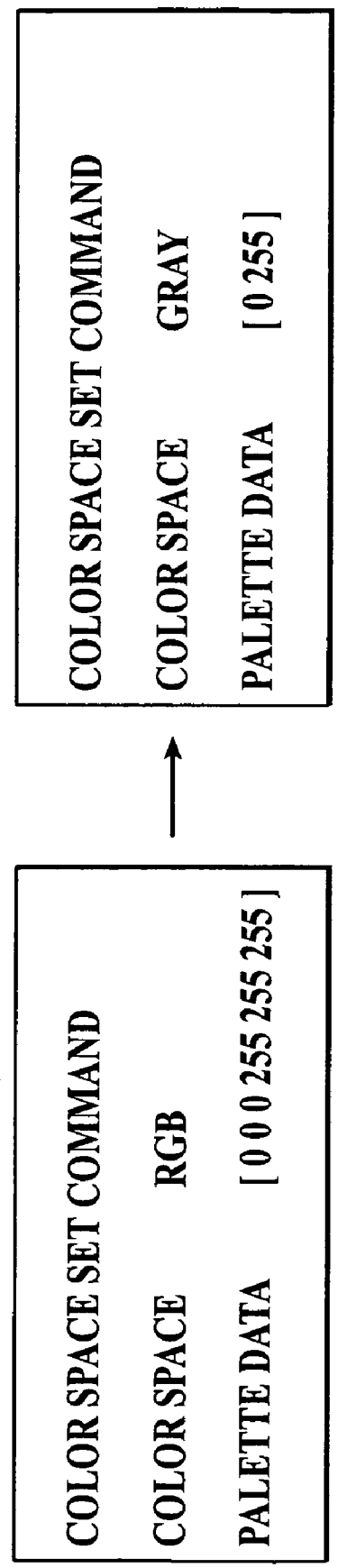
FIG. 10 is a view showing an example of the color space set command.

FIG. 10 shows an example of color space set commands. As shown in FIG. 10, in case a palette is assigned, even when the color space is RGB, palette data is converted to gray ([0 255]) and the color space command is converted to a command which assigns gray, when content of the palette data is mix gray.

Figure 8:
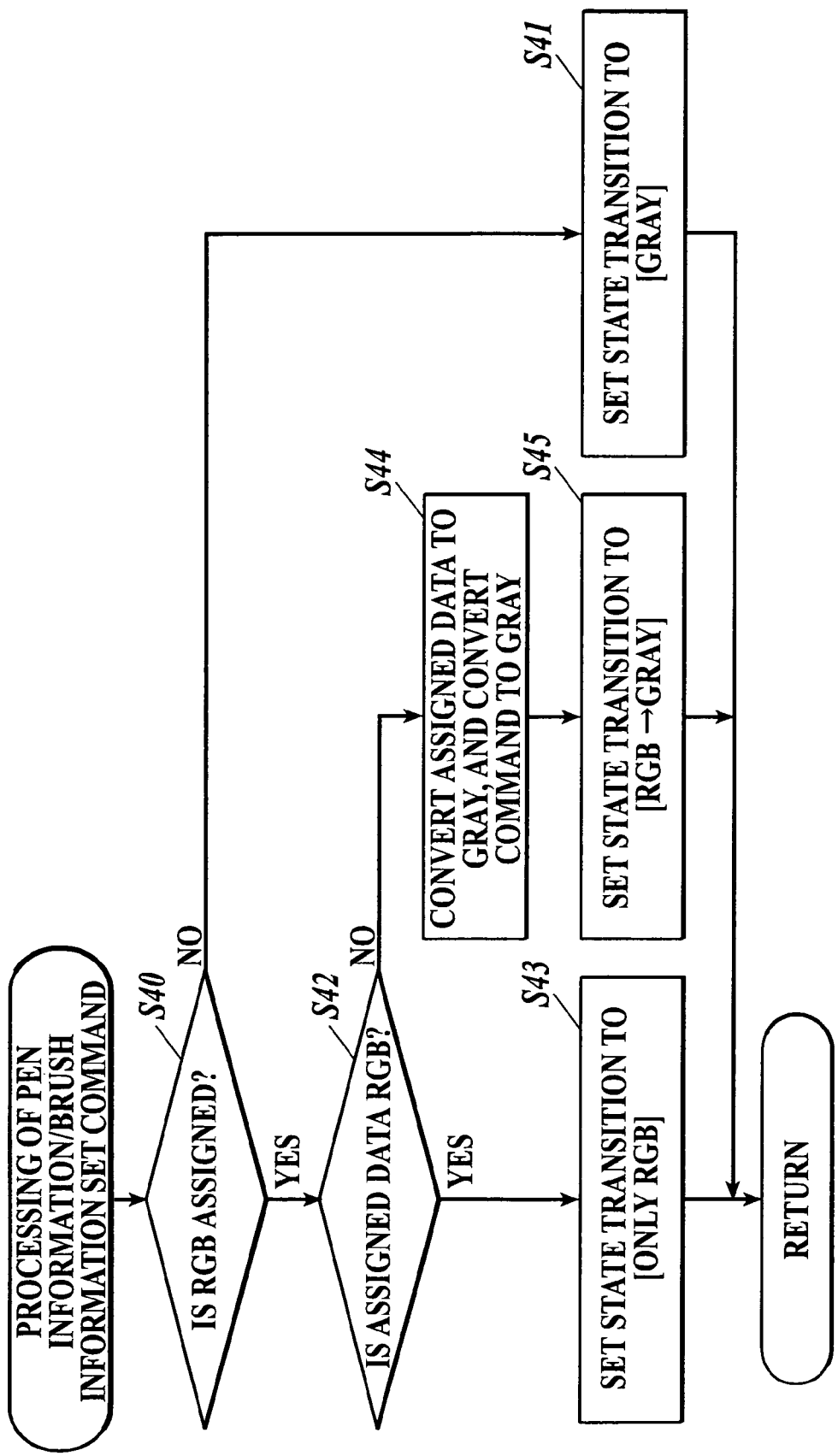
FIG. 8 is a flowchart showing processing of pen information/brush information set command.

Next, with reference to flowchart of FIG. 8, processing of pen information set command (step S23 of FIG. 6) and processing of brush information set command (step S25 of FIG. 6) will be described in detail. Since the two processing are similar, the same flowchart is used for description.

First of all, it is determined whether RGB is assigned or not in the pen information set command or the brush information set command (step S40). In step S40, when it is determined that RGB is not assigned (step S40; No), the state transition is set to [Gray] (step S41), and the processing for pen information/brush information set command is completed.

In step S40, when it is determined that RGB is assigned (step S40; Yes), it is determined whether the content of the assigned data is RGB or not (step S42). In step S42, when it is determined that the content of the assigned data is RGB (step S42; Yes), the state transition is set to [Only RGB] (step S43), and the processing for pen information/brush information set command is completed.

In step S42, when it is determined that the content of assigned data is not RGB but mix gray (step S42; No), the data is converted to gray and the command is converted to a command that assigns gray (step S44). Subsequently, the state transition is set to [RGB→Gray] (step S45), and the processing for pen information/brush information set command is completed.

Figure 9:
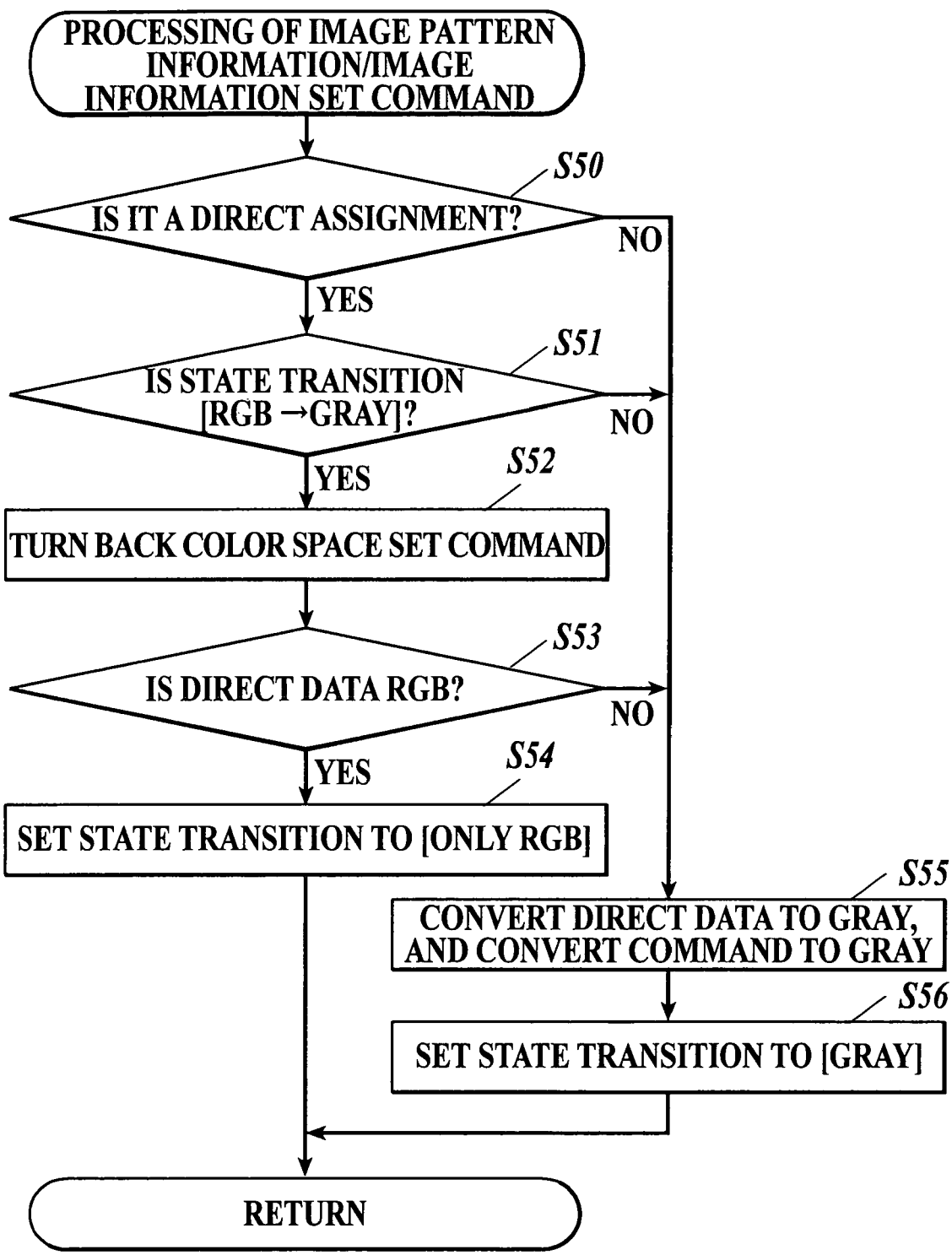
FIG. 9 is a flowchart showing processing of image pattern information/image information set command.

Next, with reference to flowchart of FIG. 9, processing of image pattern information set command (step S27 of FIG. 6) and processing of image information set command (step S29 of FIG. 6) is described in detail. Since the two processing are similar, the same flowchart is used for description.

Within image pattern information set command and image information set command, pattern and image can be assigned directly (direct assignment.) (in case of bit map data for example), or be assigned using a palette which is assigned by color space set command, respectively.

First of all, it is determined whether the image pattern information set command or the image information set command is assigned directly or not (step S50). In step S50, when it is determined that it is not direct assignment (step S50; No), the color/monochrome determination processing has already been conducted by the color space set command. Therefore, nothing is further conducted, and moves on to step S5 of FIG. 4.

In step S50, when it is determined that it is direct assignment (step S50; Yes), it is determined whether the current state transition is [RGB→Gray] or not (step S51). In step S51, when it is determined that the current state transition is not [RGB→Gray] (step S51; No), it moves on to step S53, described later.

In step S51, when it is determined that the current state transition is [RGB→Gray] (step S51; Yes), a processing to turn back the color space set command is conducted (step S52). The reason to turn back the color space set command is as follows. In case of a direct assignment, data is directly assigned within the color space assigned by the color space set command. Therefore, when the color space is changed from RGB to Gray before processing of the image pattern information set command or the image information set command has been conducted, only one third of the actual data amount is read out, in case the color space is changed to Gray although the actual data is RGB. As a result, the data left unread will be read as a command in the following command analysis. However, since this is not a command of PDL, it will result in data error.

Subsequently, it is determined whether direct data is RGB or not (step S53). In step S53, when it is determined that the direct data is RGB (step S53; Yes), the state transition is set to [Only RGB] (step S54), and the processing of image pattern information/image information set command is completed.

In step S53, when it is determined that the direct data is not RGB (step S53; No), the direct data is converted to gray and the command is converted to a command that assigns gray (step S55). Subsequently, the state transition is set to [Gray] (step S56), and the processing of image pattern information/image information set command is completed.

As aforementioned, according to the image forming device 2 of the present embodiment, by determining whether a printing is particularly a color printing or particularly a monochrome printing based on a PDL, and changing command of the PDL to a command for monochrome printing in case it is monochrome printing, memory area used can be decreased compared to conducting determination processing after rasterization. Therefore, processing speed can be increased and determination accuracy can be improved.

Particularly, by omitting determination within the page once it is determined as a color printing in that page, processing speed can be further increased.

Here, the description in the aforementioned embodiment can be modified as long as it does not deviate the scope of the present invention.

For example, in the aforementioned embodiment, processing of steps S2 through S4 in FIG. 4 were conducted within image forming device 2, which received print data from the PC 1. However, these processing can be conducted within the PC 1. That is, PC 1 may be provided with the functions of the print controlling device of the present invention. In particular, processing or steps S2 through S4 in FIG. 4 are conducted within the PC 1, and processing result of color/monochrome processing in step S4 is sent to the image forming device 2.

The present U.S. patent application claims a priority under the Paris Convention of Japanese patent application No. 2005-375359 filed on Dec. 27, 2005, and shall be a basis of correction of an incorrect translation.

What is claimed is:

1. A print controlling device comprising:
   a control unit to control printing according to an instruction which relates to the printing;
   wherein the control unit includes a color/monochrome processing unit which analyzes a command of a page description language which relates to the printing, determines whether the printing is monochrome printing or color printing for each page, does not conduct a following determination processing which relates to the printing when it is determined that the printing is color printing, and changes a first color space set command for setting a first color space that is capable of dealing with color data of the page description language to a second color space set command for setting a second color space that is capable of dealing with only monochromatic data for monochrome printing when it is determined that the printing is monochrome printing, the first and second commands being commands of the same page description language.

2. The print controlling device of claim 1, wherein the control unit further includes a color/monochrome status transition unit which manages a state transition of a current page that is analyzed by the color monochrome processing unit.

3. The print controlling device of claim 2, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

4. The print controlling device of claim 3, wherein while the command is analyzed within the page, in case the state transition becomes the state of (d) once, the color/monochrome determination processing is not conducted thereinafter within the page.

5. An image forming device comprising:
   a receiving unit to receive an instruction which relates to printing;
   a control unit to control the printing according to the instruction which relates to the printing received by the receiving unit; and
   a printing unit to execute the printing according to a control from the control unit;
   wherein the control unit includes a color/monochrome processing unit which analyzes a command of a page description language which relates to the printing, determines whether the printing is monochrome printing or color printing for each page, does not conduct a following determination processing which relates to the printing when it is determined that the printing is color printing, and changes a first color space set command for setting a first color space that is capable of dealing with color data of the page description language to a second color space set command for setting a second color space that is capable of dealing with only monochromatic data for monochrome printing when it is determined that the printing is monochrome printing, the first and second commands being commands of the same page description language.

6. The print controlling device of claim 5, wherein the control unit further includes a color/monochrome status transition unit which manages a state transition of a current page that is analyzed by the color monochrome processing unit.

7. The print controlling device of claim 6, wherein the state transition includes four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

8. The print controlling device of claim 7, wherein while the command is analyzed within the page, in case the state transition becomes the state of (d) once, the color/monochrome determination processing is not conducted thereinafter within the page.

9. A print controlling method comprising using a print controlling device to perform:
analyzing a command of a page description language which relates to a printing, and determining whether the printing is monochrome printing or color printing for each page, not conducting a following determination processing which relates to the printing when it is determined that the printing is color printing, and changing a first color space set command for setting a first color space that is capable of dealing with color data of the page description language to a second color space set command for setting a second color space that is capable of dealing with only monochromatic data for monochrome printing when it is determined that the printing is monochrome printing, the first and second commands being commands of the same page description language.

10. The print controlling device of claim 9, wherein the control unit further comprises a color/monochrome status transition unit which manages a state transition of a current page that is analyzed by the color monochrome processing unit.

11. The print controlling device of claim 10, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

12. The print controlling device of claim 11, wherein while the command is analyzed within the page, in case the state transition becomes the state of (d) once, the color/monochrome determination processing is not conducted thereinafter within the page.

13. A computer readable recording medium that stores a control program which is executed by a control unit of a print controlling device that controls printing according to an instruction which relates to the printing, the control program causing the control unit to execute:
analyzing a command of a page description language which relates to the printing, and determining whether the printing is monochrome printing or color printing for each page, not conducting a following determination processing which relates to the printing when it is determined that the printing is color printing, and changing a first color space set command for setting a first color space that is capable of dealing with color data of the page description language to a second color space set command for setting a second color space that is capable of dealing with only monochromatic data for monochrome printing when it is determined that the printing is monochrome printing, the first and second commands being commands of the same page description language.

14. The print controlling device of claim 13, wherein the control unit further comprises a color/monochrome status transition unit which manages a state transition of a current page that is analyzed by the color monochrome processing unit.

15. The print controlling device of claim 14, wherein the state transition comprises four states of: (a) a state in case the command of the page description language assigns RGB, and it is not possible to determine whether a content of the data is Gray or not; (b) a state in case the command of the page description language assigns Gray; (c) a state In case the command of the page description language assigns RGB, and a content of the data is replaced so as to assign Gray; and (d) a state in case the command of the page description language assigns RGB, and a content of the data is determined as RGE.

16. The print controlling device of claim 15, wherein while the command is analyzed within the page, in case the state transition becomes the state of (d) once, the color/monochrome determination processing is not conducted thereinafter within the page.

17. A print controlling device comprising:
a control unit to control printing according to an instruction which relates to the printing;
wherein the control unit includes a color/monochrome processing unit which analyzes a command of a page description language which relates to the printing, determines whether the printing is monochrome printing or color printing for each page, does not conduct a following determination processing which relates to the printing when it is determined that the printing is color printing, and changes a first command that is capable of dealing with color data of the page description language to a second command that is capable of dealing with only monochromatic data for monochrome printing when it is determined that the printing is monochrome printing, the first and second commands being commands of the same page description language.

18. The print controlling device of claim 17, wherein the control unit further comprises a color/monochrome status transition unit which manages a state transition of a current page that is analyzed by the color monochrome processing unit.

19. The print controlling device of claim 18, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

20. The print controlling device of claim 19, wherein while the command is analyzed within the page, in case the state transition becomes the state of (d) once, the color/monochrome determination processing is not conducted thereinafter within the page.

21. An image forming device comprising:
a receiving unit to receive an instruction which relates to printing;
a control unit to control the printing according to the instruction which relates to the printing received by the receiving unit; and
a printing unit to execute the printing according to a control from the control unit;
wherein the control unit includes a color/monochrome processing unit which analyzes a command of a page description language which relates to the printing, determines whether the printing is monochrome printing or color printing for each page, does not conduct a following determination processing which relates to the printing when it is determined that the printing is color printing, and changes a first command that is capable of dealing with color data of the page description language to a second command that is capable of dealing with only monochromatic data for monochrome printing when it is determined that the printing is monochrome printing, the first and second commands being commands of the same page description language.

22. The print controlling device of claim 21, wherein the control unit further comprises a color/monochrome status transition unit which manages a state transition of a current page that is analyzed by the color monochrome processing unit.

23. The print controlling device of claim 22, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

24. The print controlling device of claim 23, wherein while the command is analyzed within the page, in case the state transition becomes the state of (d) once, the color/monochrome determination processing is not conducted thereinafter within the page.

25. A print controlling method comprising using a print controlling device to perform:
analyzing a command of a page description language which relates to a printing, and determining whether the printing is monochrome printing or color printing for each page, not conducting a following determination processing which relates to the printing when it is determined that the printing is color printing, and changing a first command that is capable of dealing with color data of the page description language to a second command that is capable of dealing with only monochromatic data for monochrome printing when it is determined that the printing is monochrome printing, the first and second commands being commands of the same page description language.

26. The print controlling device of claim 25, wherein the control unit further comprises a color/monochrome status transition unit which manages a state transition of a current page that is analyzed by the color monochrome processing unit.

27. The print controlling device of claim 26, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

28. The print controlling device of claim 27, wherein while the command is analyzed within the page, in case the state transition becomes the state of (d) once, the color/monochrome determination processing is not conducted thereinafter within the page.

29. A computer readable recording medium that stores a control program executable by a control unit of a print controlling device that controls printing according to an instruction which relates to the printing, the control program when executed causing the control unit to perform:
analyzing a command of a page description language which relates to the printing, and determining whether the printing is monochrome printing or color printing for each page, not conducting a following determination processing which relates to the printing when it is determined that the printing is color printing, and
changing a first command that is capable of dealing with color data of the page description language to a second command that is capable of dealing with only monochromatic data for monochrome printing when it is determined that the printing is monochrome printing, the first and second commands being commands of the same page description language.

30. The print controlling device of claim 29, wherein the control unit further comprises a color/monochrome status transition unit which manages a state transition of a current page that is analyzed by the color monochrome processing unit.

31. The print controlling device of claim 30, wherein the state transition comprises four states of: (a) a state in case the command of the page description language assigns RGB, and it is not possible to determine whether a content of the data is Gray or not; (b) a state in case the command of the page description language assigns Gray; (c) a state in case the command of the page description language assigns RGB, and a content of the data is replaced so as to assign Gray; and (d) a state in case the command of the page description language assigns RGB, and a content of the data is determined as RGB.

32. The print controlling device of claim 31, wherein while the command is analyzed within the page, in case the state transition becomes the state of (d) once, the color/monochrome determination processing is not conducted thereinafter within the page.

* * * * *